(12) United States Patent
Ligeois et al.

(10) Patent No.: US 8,007,549 B2
(45) Date of Patent: Aug. 30, 2011

(54) ELECTRIC COUPLING OF A CONNECTION TO AN ELECTROCHEMICAL BUNDLE

(75) Inventors: Dominique Ligeois, St Loubes (FR); Philippe Lacoste, Pompignac (FR); Franck Fargeas, Parempuyre (FR)

(73) Assignee: Saft Groupe SA, Bagnolet (FR)

( * ) Notice: Subject to any disclaimer, the term of this patent is extended or adjusted under 35 U.S.C. 154(b) by 310 days.

(21) Appl. No.: 12/272,146

(22) Filed: Nov. 17, 2008

(65) Prior Publication Data

US 2009/0139082 A1  Jun. 4, 2009

Related U.S. Application Data

(62) Division of application No. 10/820,788, filed on Apr. 9, 2004, now abandoned.

(30) Foreign Application Priority Data

Apr. 11, 2003 (FR) ...................................... 03 04528

(51) Int. Cl.
*H01M 6/00* (2006.01)
(52) U.S. Cl. ...................................................... 29/623.1
(58) Field of Classification Search .................. 29/623.1
See application file for complete search history.

(56) References Cited

U.S. PATENT DOCUMENTS 3,761,314 A * 9/1973 Cailey .............................. 429/94
5,849,431 A * 12/1998 Kita et al. ...................... 429/164

FOREIGN PATENT DOCUMENTS

| EP | 0 955 682 | 11/1999 |
| EP | 1 102 337 | 5/2001 |
| EP | 1102337 | 5/2001 |
| EP | 1102337 A1 * | 5/2001 |

* cited by examiner

*Primary Examiner* — Karie O'Neill Apicella
(74) *Attorney, Agent, or Firm* — Sughrue Mion, PLLC

(57) ABSTRACT

The subject of the present invention is a system for electric coupling of a plane connection (64, 67) to the electrodes of the same polarity of an electrochemical bundle (63) comprising an alternating sequence of at least one positive electrode and at least one negative electrode framing a separator, each electrode comprising a metal strip less than 50 $\mu$m thick, serving as current collector, at least one surface of which is coated with a paste containing the electrochemically active material, the strips of the electrodes of each polarity comprising a non-coated lateral band emerging respectively from the opposite ends of said bundle, characterized in that the lateral bands of the strips of the same polarity are folded in a direction approximately perpendicular to their initial direction at a height at least equal to the distance separating them from the adjacent strips of the same polarity in order to form an approximately plane and continuous base (65, 68) to which said plane connection is welded.

14 Claims, 3 Drawing Sheets

ELECTRIC COUPLING OF A CONNECTION TO AN ELECTROCHEMICAL BUNDLE

This is a divisional of application Ser. No. 10/820,788 filed Apr. 9, 2004 now abandoned. The entire disclosure of the prior application, application Ser. No. 10/820,788 is considered part of the disclosure of the accompanying divisional application and is hereby incorporated by reference.

BACKGROUND OF THE INVENTION

The present invention relates to a system of electric coupling between a connection electrically connected to a current output terminal, and an electrochemical bundle. It moreover extends to the method for producing this coupling.

An electrochemical generator comprises an electrochemical bundle comprising an alternating sequence of positive and negative electrodes framing a separator impregnated with electrolyte. Each electrode most often comprises a metal current collector supporting on at least one of its surfaces the electrochemically active material. The electrode is connected electrically to a current output which ensures electrical continuity between the electrode and the external application with which the generator is associated. This current output can be the container of the generator or a current output terminal.

There are several ways of electrically coupling an electrode to a current output terminal. One of these ways is the use of a plane connection which is applied to the juxtaposed collectors of the electrodes of the same polarity.

According to the document EP-0 029 925, the electric coupling is carried out by means of a full disk arranged then welded on the winding section of the spirally wound electrodes.

For example the document U.S. Pat. No. 4,009,053 describes a generator with alkaline electrolyte and spirally wound electrodes. It shows a plane circular connection carrying radial slots having the form of lances, the turned-down edges of which serve to establish the electric contact with the collector of the spirally wound electrode.

In electrochemical generators with aqueous electrolyte such as the Ni—Cd generators, the electrode support is a nickel-coated steel strip approximately 0.2 mm thick. There are no particular difficulties with welding directly to the strip section a piece electrically connected to the terminal. On the other hand, in electrochemical generators with organic electrolyte with which the invention is concerned, such as lithium generators or supercapacitors, the support of the positive electrode is generally a thin aluminum strip less than 50 μm thick and that of the negative electrode is a thin copper strip less than 50 μm thick. Such thinnesses do not offer the mechanic resistance necessary for producing reliable welds on the electrode section.

From the document EP 1 102 337 an electrochemical generator is known comprising an alternating sequence of spirally wound positive and negative electrodes constituting an electrochemical bundle. Each electrode comprises a metal strip serving as a current collector. The strips of the same polarity respectively jut out towards the outside of the bundle in order to form a plane base on which a plane connection is attached.

The portions of the strips jutting out on either side of the electrochemical bundle do not however form a continuous plane base. The strips are folded at 90° by a pressing tool. Such a method does not make it possible to produce a metal barrier with folded strips forming a continuous plane base.

As regards techniques developed within the context of electrode plates (not spirally wound), the document FR-2 748 606 proposes for example a method of connection by expansion. The edges of the electrodes are put together in two semi-bundles coupled horizontally to the current output terminal.

SUMMARY OF THE INVENTION

The present invention aims to eliminate the drawbacks of the prior art and, in particular, to propose a solution which can easily be produced industrially.

More precisely, the invention aims to propose a system of electric coupling by the welding of a plane connection to the electrode section of the same polarity in a manner simpler than the systems described in the prior art.

The subject of the present invention is a system of electric coupling of a plane connection to the electrodes of the same polarity of an electrochemical bundle comprising an alternating sequence of at least one positive electrode and at least one negative electrode framing a separator, each electrode comprising a metal strip less than 50 μm thick, serving as current collector, at least one surface of which is coated with electrochemically active material, the strips of the electrodes of each polarity comprising a non-coated lateral band emerging respectively from the opposite ends of said bundle, characterized in that the lateral bands of the strips of the same polarity are folded in a direction approximately perpendicular to their initial direction at a height at least equal to the distance separating them from the adjacent strips of the same polarity in order to form an approximately plane and continuous base to which said plane connection is welded.

According to a preferred embodiment, the lateral bands are folded at a height comprised between 3 and 4 mm. Thus the space found between two successive strips is re-covered and closed by the folded part, preventing any intrusion of material inside the electrochemical bundle. The invention therefore has the advantage of considerably reducing the risks of short-circuits between the electrodes of the opposite polarity.

In order to allow them to fold in the desired manner, the strips must not exceed 50 μm in thickness. However for reasons of mechanical strength and resistance to manipulation, the strips preferably have a minimum thickness comprised between 10 μm and 15 μm; a minimum of 10 μm for a copper strip and a minimum of 15 μm for an aluminum strip.

According to a first variant, the connection is electrically connected to a current output.

According to a second variant, the connection constitutes a current output.

According to a particular embodiment, the electrochemical bundle comprises a positive electrode and a negative electrode, framing a separator, which are spirally wound in order to form a coil. In this case the non-coated part of the positive strip will project out of one of the circular sections and that of the negative strip symmetrically out of the other section.

Preferably, the lateral band of the positive electrode has a height comprised between 13 mm and 17 mm.

Preferably, the lateral band of the negative electrode has a height comprised between 8 mm and 12 mm.

Preferably, the plane connection is welded at a distance of at least 3 mm from one end of the separator of the electrochemical bundle.

Preferably, the lateral bands are folded in a concertina manner.

Preferably, the plane connection is a blade not covering all of the surface of the plane base formed by said folded lateral bands.

A subject of the present invention is also an electrochemical generator comprising an electric coupling system as described previously. The electrochemical generator according to the invention can comprise electrode plates or spirally wound electrodes. This generator can also be a lithium generator, in particular a rechargeable generator, for example of the "lithium-ion" type, or a supercapacitor.

In the case where the electrochemical generator is of the lithium-ion type, it comprises a negative electrode in which the active material is a carbonated material capable of inserting lithium into its structure, chosen in particular from graphite, coke, carbon black, and glassy carbon. It also comprises a positive electrode in which the active material is chosen from a transition metal oxide, a sulphide, a sulphate and their mixtures.

In the case where the generator in question is a supercapacitor, the electrodes have activated carbon as active material.

According to a first variant, in which the generator comprises electrode plates, the plane connection is welded according to at least one weld line perpendicular to the plane of the electrodes.

According to a second variant, in which the generator comprises spirally wound electrodes, the plane connection is welded according to at least one weld line tangent to the winding axis of the electrodes.

A subject of the present invention is also a method of electric coupling of a plane connection to the electrodes of the same polarity of an electrochemical bundle with a view to obtaining the system described previously, comprising the following steps:

at least one positive electrode, at least one negative electrode and at least one separator are put together to form an electrochemical bundle in order to let a lateral band of the electrodes of opposite polarity respectively protrude from the opposite ends of the bundle.

a pressure is exerted on the section of the lateral bands of the electrodes of the same polarity in order to fold them, a plane connection is welded to the base constituted by the folded lateral bands.

According to a first variant embodiment, the plane connection is laser-welded with addition of material to the folded bands.

According to a second variant embodiment, said connection is transparency laser-welded onto the folded bands.

According to one embodiment, the folding of the lateral bands is carried out by repeated flattening of said bands by small successive passes of a hammer over the same surface.

Preferably, the surface flattened by one pass is comprised between 20 and 50 mm$^2$.

A subject of the present invention is also a method for manufacturing an electrochemical generator comprising the system of electric coupling of a plane connection to the electrodes of the same polarity of an electrochemical bundle described previously.

An advantage of the present invention is a considerable reduction in the duration of the stage of coupling of the connection.

BRIEF DESCRIPTION OF THE DRAWINGS

The invention will be understood better and other advantages and features will become apparent on reading the description which follows, provided by way of illustration, but by no means limitatively, accompanied by the attached drawings in which.

DETAILED DESCRIPTION OF THE INVENTION

Figure 1:
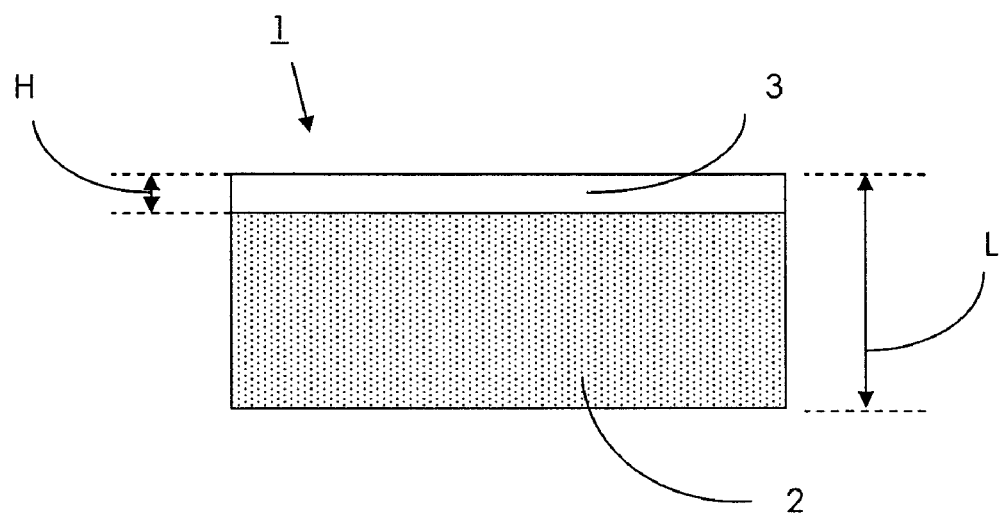
FIG. 1 shows an electrode.

FIG. 1 represents the end of an electrode 1 of total width L on which is distinguished the layer 2 of active material occupying the greater part of the surface of the electrode and a lateral band 3 of height H constituted by the one strip which has not been covered with active material.

Figure 2:
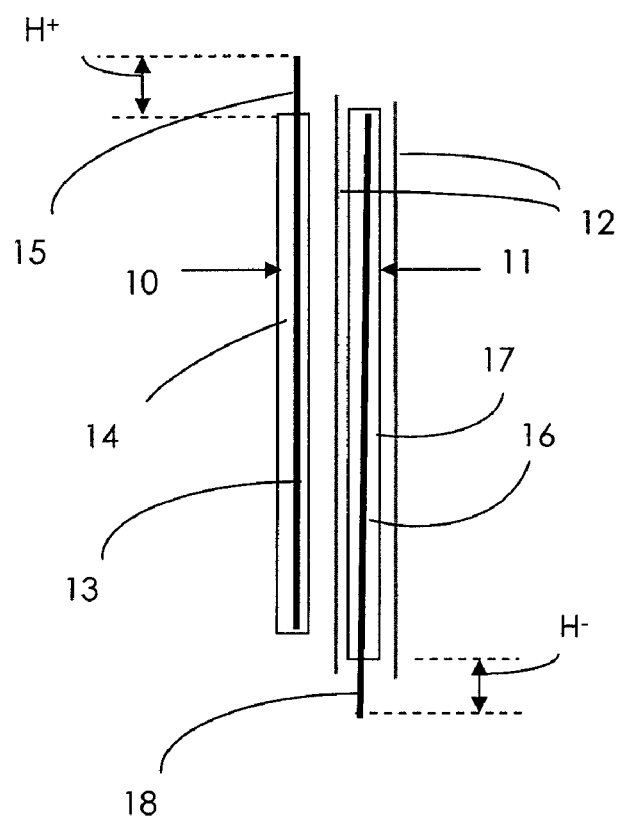
FIG. 2 represents diagrammatically in section part of the electrochemical bundle.

Electrodes of the type represented in FIG. 1 and carrying respectively positive and negative active materials are assembled in a bundle. Part of an electrochemical bundle, comprising a positive electrode 10 and a negative electrode 11 between which are interposed separators 12 is represented in FIG. 2. The positive electrode 10 comprises a strip 13 covered with a layer 14 containing the positive active material. At one of the ends of the strip 13 a lateral band 15 has been reserved which does not carry any active material. This band 15 protrudes from the bundle and has a height H+ comprised between 13 mm and 17 mm. The negative electrode 11 comprises a strip 16 covered by a layer 17 containing the negative active material. At one of the ends of the strip 16 a lateral band 18 has been reserved which does not carry any active material. This band 18 protrudes from the end of the bundle opposite that where the band 15 is situated. It has a height H− comprised between 8 mm and 12 mm. The separators 12 project slightly from the part of the electrodes coated with active material in order to avoid short-circuits.

Figure 3:
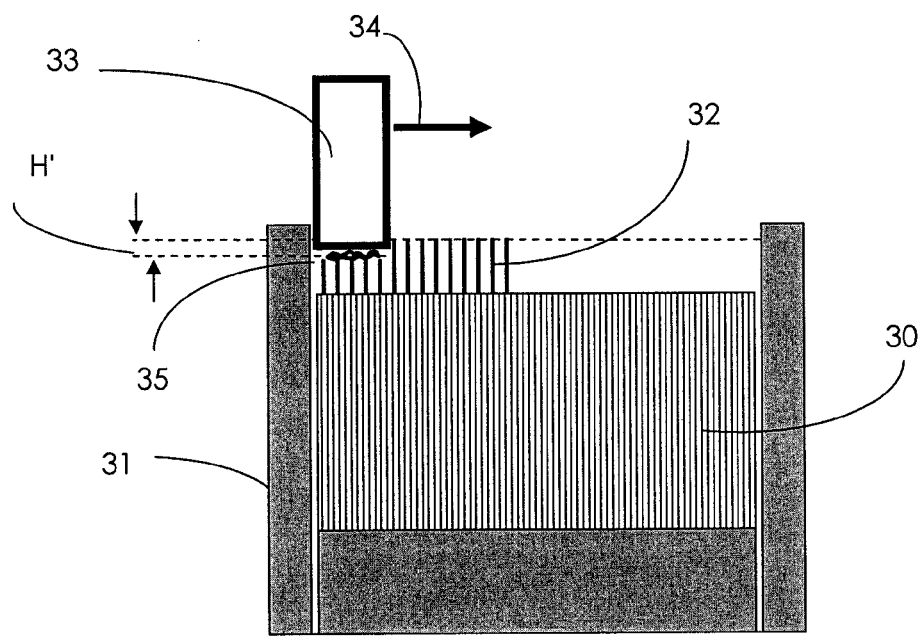
FIG. 3 shows a cross-section of a generator during the operation of folding the non-coated lateral bands.

The electrochemical bundle 30 once constituted is held in a centering tool 31, as shown in FIG. 3, and the non-coated protruding lateral bands 32 are curved using a tool 33, such as for example a hammer with a diameter of 15 to 20 mm. The hammer 33 can be advantageously constituted by a plurality of small hammers, from 5 to 8 mm in diameter, arranged in series.

The hammer 33 is moved from top to bottom with a travel of 3 mm, then is moved towards the centre of the bundle in the direction indicated by the arrow 34 after each rotation of the latter. A set of folded strips 35 is obtained at a height H' of approximately 3 to 4 mm.

The abovementioned heights H+ and H− of the lateral bands 15, 18 are such that the non-folded strips protrude 6 to 7 mm from the ends of the separators 12. Thus, during the subsequent stage of folding of the lateral bands at a height H', the ends of the separators are still remoted at least 3 mm away from the base of the folded strips 35. Such a distance between the folded strips and the ends of the separators makes it possible to avoid any risk of burning the separators during the subsequent stage of welding a plane connection to the folded strips.

According to a preferred embodiment, the folding of the non-coated lateral bands 32 of the strips 15 is obtained by repeated flattening of said bands by small successive passes of the hammer 33 over the same surface of approximately 20 to 50 mm$^2$, the hammer 33 carrying out a movement from top to bottom until a plane surface is obtained. The lateral bands of the strips of the same polarity are thus folded in a sort of "concertina" in order to form a continuous plane base approximately perpendicular to the initial direction of the strips.

Figure 4:
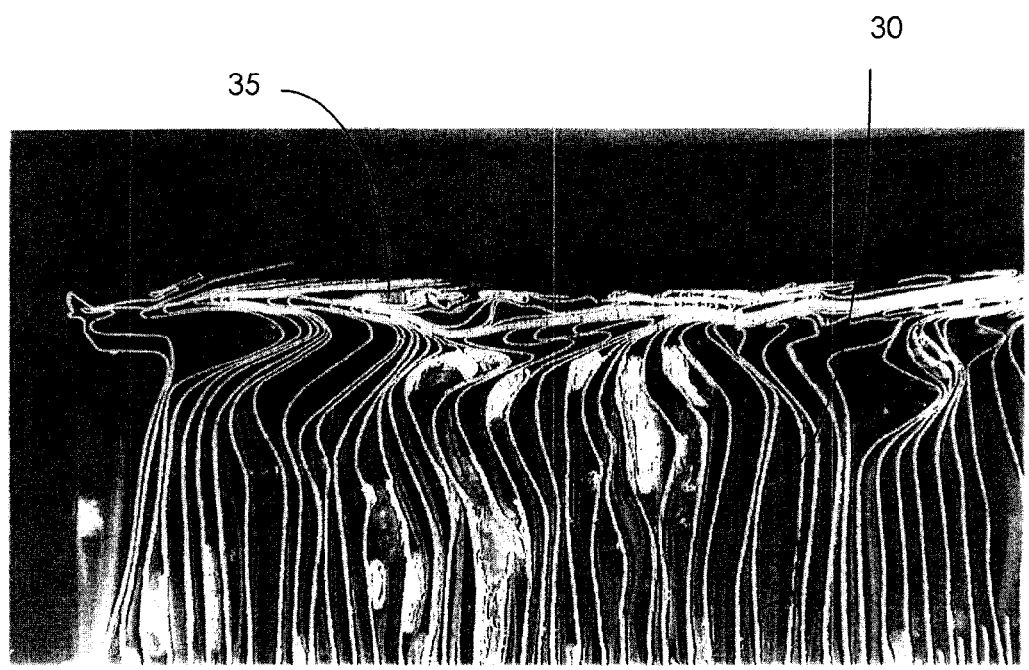
FIG. 4 shows in cross-section an electrochemical bundle after folding of the non-coated bands

FIG. 4 shows the appearance of the bundle of electrodes 30 after this operation in which the folded lateral bands 35 are seen, forming a plane and continuous base.

The base 35 thus formed constitutes a metal barrier allowing laser-welding of a plane connection.

Figure 5:
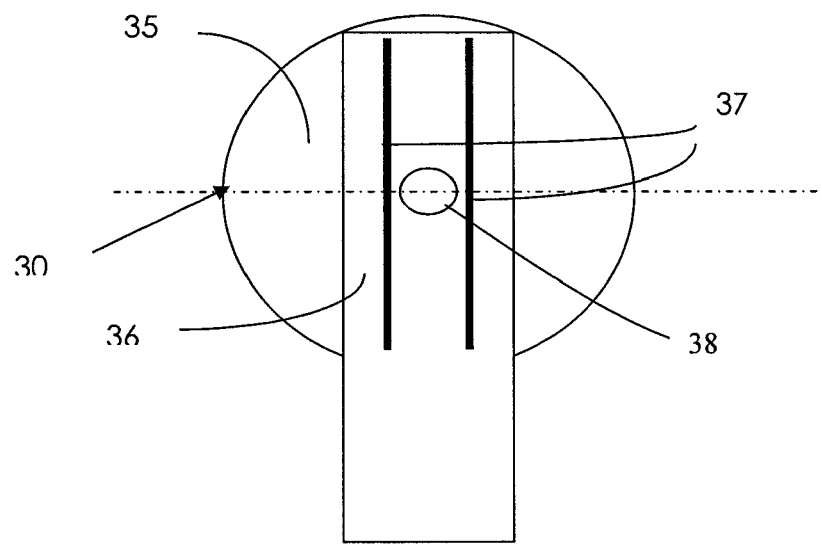
FIG. 5 is a top view of the bundle equipped with its connection, or FIG. 6 diagrammatically represents a cross-section of an electrochemical generator according to the invention.

This base 35 receives a connection 36 which is laser-welded, with addition of material or by transparency, in order to form two parallel beads 37 visible in FIG. 5.

This laser-welding is carried out without piercing the connection plate 36. During transparency welding, material from the base 35 is melted by the laser beam which heats the lateral bands of the folded strips. This molten material spreads over the base 35 in order to constitute the weld. Such a welding method makes it possible to avoid any risk of the weld projecting inside the bundle.

The plane connection 36 can be a blade not covering all of the surface of the plane base 35 formed by the lateral bands of the folded strips. Thus, the gases released from the electrochemical bundle can be directly evacuated via the ends of the bundle. In fact, the continuous plane base formed by the folded strips is not gas-tight.

Moreover, the plane connection 36 can also be pierced with a hole 38 in the axis of the bundle of electrodes 30 in order to allow a good release of gases via this opening.

Figure 6:
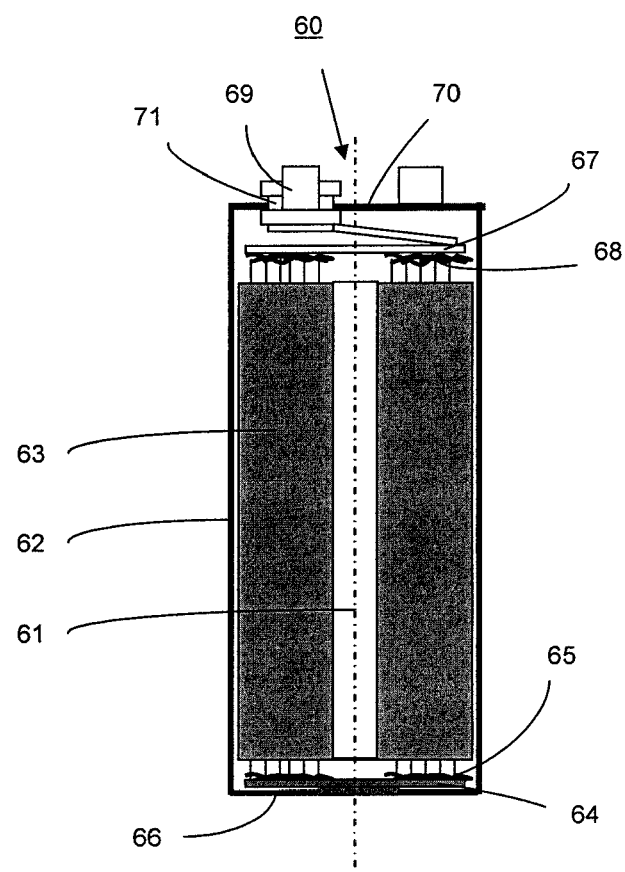

FIG. 6 represents an electrochemical generator 60, cylindrical in shape, with a hollow axis 61 comprising a container 62 made of aluminum into which a bundle 63 has been introduced, comprising a spirally wound positive electrode and negative electrode. The plane positive connection 64 made of aluminum is welded on the one hand by laser-welding to the non-coated bands 65 of the aluminum strip of the negative electrode, previously folded down in the manner described previously. The positive connection 64 is on the other hand welded to the base 66 of the container 62 by laser-welding or by electric welding, the two types of welding being tight. The plane negative connection 67, made of copper or nickel-coated copper, is welded in the same manner to the non-coated bands 68 of the copper strip of the positive electrode previously folded down in the manner described previously. The negative connection 67 is on the other hand welded to a current output terminal 69 by laser-welding or ultrasound welding. The terminal 69 of negative polarity is fixed to a cover 70 which is welded or crimped onto the container 62. The terminal 69 is electrically insulated from the cover 70 by an isolating seal 71.

In the case of an electrochemical generator comprising spirally wound electrodes, the plane connection is welded according to at least one welding line tangent to the winding axis of the electrodes, as close as possible to this winding axis, in order to cover a maximum of the metal strips.

Moreover, in the case of an electrochemical generator comprising electrode plates, the plane connection is welded according to at least one weld line perpendicular to the plane of the electrodes.

What is claimed is:

1. Method of electric coupling of a plane connection to electrodes of the same polarity of an electrochemical bundle comprising an alternating sequence of at least one positive electrode and at least one negative electrode framing a separator, each electrode comprising a metal strip less than 50 µm thick, serving as current collector, at least one surface of which is coated with a paste containing an electrochemically active material, the method comprising the following steps:
   at least one positive electrode, at least one negative electrode and at least one separator are put together to form an electrochemical bundle in order to let a lateral band of said electrodes of opposite polarity respectively protrude from opposite ends of said bundle,
   a pressure is exerted on the section of said lateral bands of the electrodes of the same polarity in order to fold them, the folding of the lateral bands being carried out by repeated flattening of said bands by small successive passes of a hammer over the same surface, the surface flattened by one pass of the hammer over the surface being comprised between 20 and 50 mm$^2$,
   a plane connection is welded to a base constituted by said folded lateral bands.

2. Method according to claim 1, in which said plane connection is laser-welded with addition of material to said folded bands.

3. Method according to claim 1, in which said plane connection is transparency laser-welded to said folded bands.

4. Method according to claim 1, in which said lateral bands are folded at a height comprised between 3 and 4 mm.

5. Method according to claim 1, in which said strip has a minimum thickness comprised between 10 gm and 15 gm.

6. Method according to claim 1, in which said connection is electrically connected to a current output.

7. Method according to claim 1, in which said connection constitutes a current output.

8. Method according to claim 1, in which said lateral band of the positive electrode has a height comprised between 13 mm and 17 mm.

9. Method according to claim 1, in which said lateral band of the negative electrode has a height comprised between 8 mm and 12 mm.

10. Method according to claim 1, in which said plane connection is welded at a distance of at least 3 mm from one end of the separator of the electrochemical bundle.

11. Method according to claim 1, in which said lateral bands are folded in a concertina manner.

12. Method according to claim 1, in which said plane connection is a blade not covering all of the surface of the plane base formed by said folded lateral bands.

13. Method according to claim 1, in which said plane connection is welded according to at least one weld line perpendicular to the plane of the electrodes.

14. Method according to claim 1, in which said plane connection is welded according to at least one weld line tangent to the winding axis of the electrodes.

* * * * *